(12) United States Patent
Martius et al.

(10) Patent No.: US 9,712,925 B2
(45) Date of Patent: Jul. 18, 2017

(54) DUAL ANTENNA SYSTEM AND METHOD FOR CHARGING ONE OR MORE HEARING AIDS

(71) Applicant: SIEMENS AKTIENGESELLSCHAFT, Munich (DE)

(72) Inventors: Sebastian Martius, Forchheim (DE); Benjamin Sewiolo, Obermichelbach ot Rothenberg (DE)

(73) Assignee: Siemens Aktiengesellschaft, Munich (DE)

( * ) Notice: Subject to any disclaimer, the term of this patent is extended or adjusted under 35 U.S.C. 154(b) by 209 days.

(21) Appl. No.: 14/602,452

(22) Filed: Jan. 22, 2015

(65) Prior Publication Data
US 2015/0208180 A1 Jul. 23, 2015

(30) Foreign Application Priority Data
Jan. 22, 2014 (DE) .................... 10 2014 201 118

(51) Int. Cl.
| | | |
|---|---|---|
| H02J 7/00 | (2006.01) | |
| H04R 25/00 | (2006.01) | |
| H02J 7/02 | (2016.01) | |
| H02J 17/00 | (2006.01) | |
| H01Q 1/27 | (2006.01) | |

(52) U.S. Cl.
CPC ............. *H04R 25/30* (2013.01); *H01Q 1/273* (2013.01); *H02J 7/025* (2013.01); *H02J 17/00* (2013.01); *H02J 7/0044* (2013.01); *H04R 25/554* (2013.01); *H04R 2225/31* (2013.01)

(58) Field of Classification Search
CPC ........................................................ H02J 7/025
USPC ............................................................ 320/108
See application file for complete search history.

(56) References Cited

U.S. PATENT DOCUMENTS

| | | |
|---|---|---|
| 4,680,548 A | 7/1987 | Edelstein et al. |
| 6,930,482 B2 | 8/2005 | Heid et al. |
| 8,344,689 B2 | 1/2013 | Boguslavskij |
| (Continued) | | |

FOREIGN PATENT DOCUMENTS

| | | |
|---|---|---|
| DE | 102004012058 B4 | 4/2009 |
| DE | 102008008899 A1 | 8/2009 |
| (Continued) | | |

*Primary Examiner* — Edward Tso
*Assistant Examiner* — Ahmed Omar
(74) *Attorney, Agent, or Firm* — Laurence A. Greenberg; Werner H. Stemer; Ralph E. Locher

(57) ABSTRACT

To make the charging of hearing aids more convenient, a charging device for wirelessly charging a hearing aid is provided. The charging device has a cylindrical container, an integrated antenna for generating an alternating magnetic field in the container in the event of electrical excitation, and a charging circuit which can be used to electrically excite the antenna. The antenna is a birdcage antenna in which rods are arranged parallel to a cylinder axis on a cylinder jacket and the ends of the rods at the edges of the cylinder jacket are each connected to an end ring. A switching element is arranged in each of the rods. The charging circuit is used to alternately generate a circular magnetic field, in which case the switching elements are operated in a closed mode, and a linear magnetic field, in which case the switching elements are operated in an open mode.

11 Claims, 2 Drawing Sheets

(56) References Cited

U.S. PATENT DOCUMENTS

| | | | |
|---|---|---|---|
| 2007/0104343 A1* | 5/2007 | Bengtsson | H04R 25/305 381/323 |
| 2007/0164237 A1 | 7/2007 | Bernhardt | |
| 2007/0290654 A1 | 12/2007 | Govari et al. | |
| 2009/0256640 A1 | 10/2009 | Reilly et al. | |
| 2012/0098540 A1 | 4/2012 | Biber et al. | |
| 2012/0313645 A1* | 12/2012 | Biber | G01R 33/3692 324/322 |

FOREIGN PATENT DOCUMENTS

| | | |
|---|---|---|
| DE | 102008023352 A1 | 11/2009 |
| DE | 102010042633 A1 | 4/2012 |
| DE | 102011076918 A1 | 12/2012 |
| EP | 1868275 A2 | 12/2007 |

\* cited by examiner

DUAL ANTENNA SYSTEM AND METHOD FOR CHARGING ONE OR MORE HEARING AIDS

CROSS-REFERENCE TO RELATED APPLICATION

This application claims the priority, under 35 U.S.C. §119, of German application DE 10 2014 201 118.3, filed Jan. 22, 2014; the prior application is herewith incorporated by reference in its entirety.

BACKGROUND OF THE INVENTION

Field of the Invention

The present invention relates to a charging device for wirelessly charging at least one hearing aid. The charging device has a cylindrical container, an antenna for generating an alternating magnetic field in the container in the event of electrical excitation, and a charging circuit which can be used to electrically excite the antenna. In addition, the present invention relates to a method for wirelessly charging at least one hearing aid.

Hearing aids are portable hearing devices used to support the hard of hearing. In order to make concessions for the numerous individual requirements, different types of hearing aids are provided, e.g. behind the ear (BTE) hearing aids, hearing aids with an external earpiece (receiver in the canal [RIC]) and in the ear (ITE) hearing aids, for example concha hearing aids or canal hearing aids (ITE, CIC) as well. The hearing aids listed in an exemplary fashion are worn on the concha or in the auditory canal. Furthermore, bone conduction hearing aids, implantable or vibrotactile hearing aids are also commercially available. In this case, the damaged sense of hearing is stimulated either mechanically or electrically.

In principle, the main components of the hearing aids are an input transducer, an amplifier and an output transducer. In general, the input transducer is a sound receiver, e.g. a microphone, and/or an electromagnetic receiver, e.g. an induction coil. The output transducer is usually configured as an electroacoustic transducer, e.g. a miniaturized loudspeaker, or as an electromechanical transducer, e.g. a bone conduction earpiece. The amplifier is usually integrated in a signal processing unit. The basic structure is illustrated in FIG. 1 using the example of a behind the ear hearing aid. One or more microphones 22 for recording the sound from the surroundings are installed in a hearing aid housing 21 to be worn behind the ear. A signal processing unit 23, likewise integrated in the hearing aid housing 21, processes the microphone signals and amplifies them. The output signal from the signal processing unit 23 is transferred to a loudspeaker or earpiece 24 which emits an acoustic signal. If necessary, the sound is transferred to the eardrum of the equipment wearer using a sound tube which is fixed in the auditory canal with an ear mold. A battery 25 likewise integrated in the hearing aid housing 21 supplies the hearing aid and in particular the signal processing unit 23 with energy.

Hearing aids have hitherto usually been charged in a wired manner or using electrical contacts. This has two disadvantages. On the one hand, two contacts which are accessible to the outside and therefore must be mechanically protected and/or switched in a potential-free manner must be fitted to the hearing aid itself for charging. On the other hand, the hearing aid must be inserted into a special holder for charging so that the electrical contacts can be made.

However, wireless charging of a hearing aid has also already been proposed. For example, there is a prototype of a wireless charging device from the company Humavox. Such a system has a type of antenna which generates a circular field. It is therefore possible to position a hearing aid having a linearly polarized antenna in a plane (horizontal or vertical) in a manner independent of the angle. If both planes should be usable, a special antenna would also have to be used for this purpose for the second plane in the hearing aid itself, which antenna in turn requires a certain amount of space in the hearing aid.

German patent DE 10 2004 012 058 B4 discloses generators of time-variable magnetic fields in a magnetic resonance device having at least one gradient coil. The generator has a radio-frequency antenna element which is in the form of a so-called "birdcage antenna". In this case, a birdcage antenna for generating a homogeneous radio-frequency field inside a volume surrounded by it is generally configured in such a manner that conductors which are parallel to one another and are equally spaced apart from one another are arranged on a cylinder jacket and are connected to one another by end rings. In this case, tuning is carried out in high-pass and low-pass filter ranges by introducing capacitances into each of the conductors or into the end rings between the conductors, thus resulting in a homogeneous radio-frequency field at resonance. Embodiments of such birdcage antennas are also found, for example, in the U.S. Pat. No. 4,680,548.

SUMMARY OF THE INVENTION

The object of the present invention is to provide a charging device which can be used to charge a hearing aid, which has a linearly polarized antenna, in any position of the hearing aid in the charging device. In addition, the intention is to provide a corresponding method for wirelessly charging a hearing aid.

According to the invention, the object is achieved by a charging device for wirelessly charging at least one hearing aid, having a cylindrical container, an antenna for generating an alternating magnetic field in the container in the event of electrical excitation, and a charging circuit which can be used to electrically excite the antenna. The antenna is in the form of a birdcage antenna, in which rods are arranged parallel to a cylinder axis on a cylinder jacket and the ends of the rods at the edges of the cylinder jacket are each connected to an end ring, and is integrated in the container. A switching element is respectively arranged in each of the rods of the antenna. The charging circuit can be used to alternately generate, in the antenna, a circular magnetic field, in which case the switching elements are operated in a closed mode, and a linear magnetic field, in which case the switching elements are operated in an open mode.

In addition, the invention provides a method for wirelessly charging at least one hearing aid by providing a cylindrical container in which a birdcage antenna, in which rods are arranged parallel to a cylinder axis on a cylinder jacket and the ends of the rods at the edges of the cylinder jacket are each connected to an end ring, is integrated. A switching element is respectively arranged in each of the rods of the birdcage antenna. The hearing aid is introduced into the container. A circularly polarized magnetic field is alternately generated, in which case the switching elements are operated in a closed mode, and a linearly polarized magnetic field, in which case the switching elements are operated in an open mode, in the birdcage antenna. The hearing aid in at least one of the two fields is charged.

The charging device therefore advantageously has a birdcage antenna which is energized in such a manner that a circularly polarized field and a linearly polarized field are produced in temporal alternation in its interior. The magnetic field of the birdcage antenna therefore has field components in each spatial direction over a predefined period of time which contains the closed mode and the open mode of the switching elements of the antenna. This means that a linearly polarized antenna can be charged in any desired spatial position and orientation in the container or the birdcage antenna of the charging device.

The switching elements are preferably each PIN diodes. In principle, they may naturally also be other power-resistant switching elements, for example transistors, FETs, relays or MEMS.

The charging circuit advantageously has two individual sources and two amplifiers. As a result, the energization of the antenna can be handled in a very flexible manner.

In addition, the charging circuit may contain two matching networks. These matching networks can be used to optimize the efficiency of the charging process.

In another advantageous refinement, the sources are connected to the end rings of the antenna in a manner offset through 90° with respect to one another. This makes it possible to favorably generate a circularly polarized magnetic field in the birdcage antenna.

The matching networks are favorably switched in synchronism with the switching elements. This makes it possible to optimize electrical matching in each switching mode of the switching elements.

The charging circuit may also have a phase shifter. This makes it possible to set the suitable phase in good time depending on the operating mode.

In one special refinement, the two sources each have a direct digital synthesis (DDS) circuit. This makes it possible to very accurately synthesize suitable feed signals.

In an alternative embodiment, the charging circuit may have only a single source which is connected to the antenna via a Wilkinson splitter. This makes it possible to save one source and to easily control the birdcage antenna.

Other features which are considered as characteristic for the invention are set forth in the appended claims.

Although the invention is illustrated and described herein as embodied in a dual antenna system and a method for charging one or more hearing aids, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

The exemplary embodiments described in more detail below represent preferred embodiments of the present invention.

Figure 1:
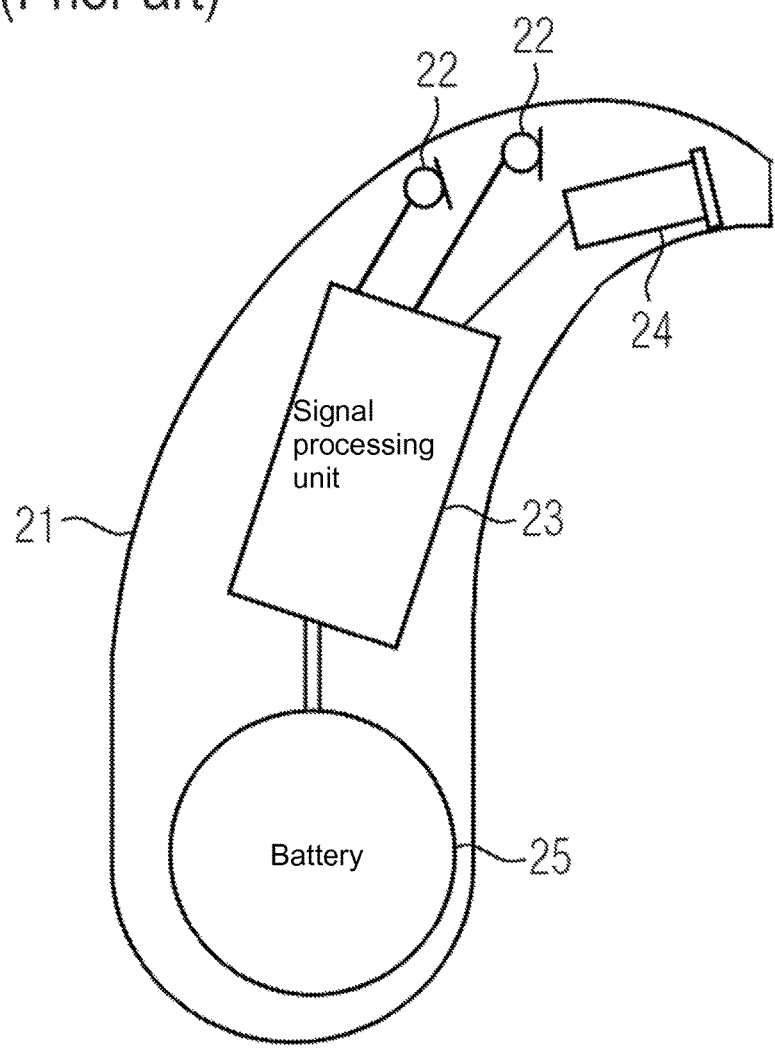
FIG. 1 is an illustration of a basic structure of a hearing aid according to the prior art.

Referring now to the figures of the drawings in detail and first, particularly to FIG. 1 thereof, there is shown a hearing aid that is intended to be wirelessly charged. For this purpose, such a hearing aid has, for example, a linearly polarized antenna in the form of a linear coil. For the purpose of charging, energy is inductively injected into this coil which is not illustrated in FIG. 1. This can be carried out only as a result of the fact that one component of the alternating magnetic field passes through the charging coil.

A fixed charging position is not intended to be predefined in the charging device in order to simplify handling. Therefore, the direction in which a linearly polarized receiving antenna of a hearing aid to be charged points cannot be ensured. Therefore, the invention provides for the magnetic field to have temporally alternating spatial direction components in a charging area of a charging device. In particular, the two spatial directions of one plane are intended to be generated by a circularly polarized field and the further spatial direction orthogonal thereto is intended to be generated by an additional linear field. A circularly polarizable and a linearly polarizable antenna must therefore be used for this purpose.

Figure 2:
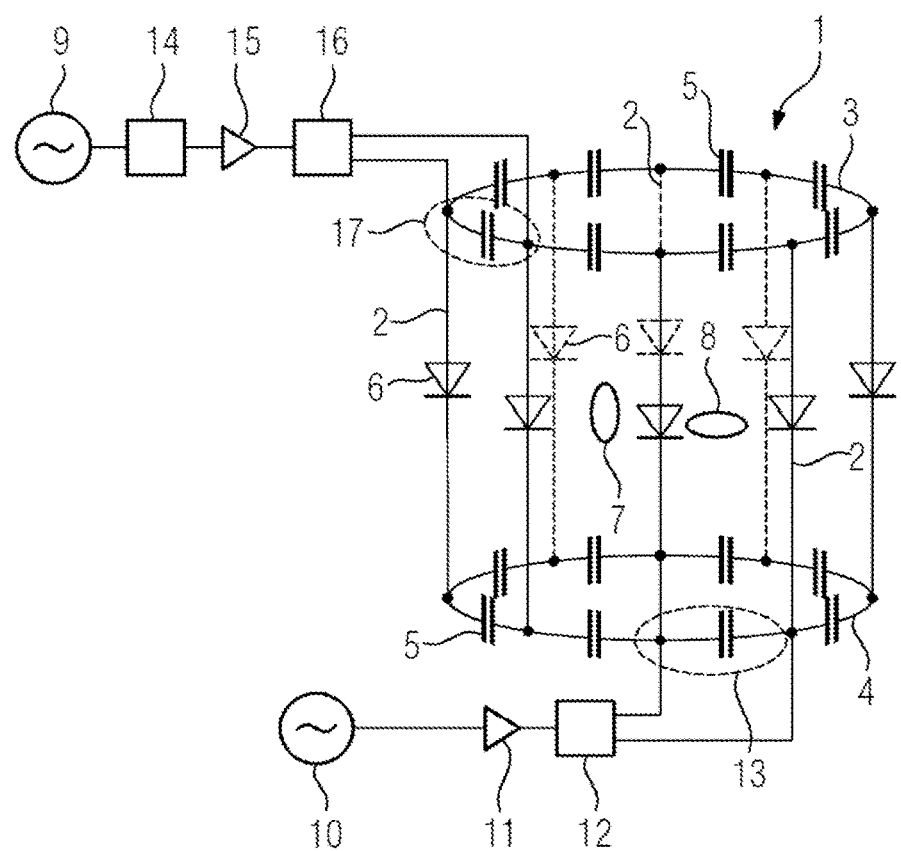
FIG. 2 is a circuit diagram of a charging device according to the invention.

In order to be able to provide both magnetic field types (linearly polarized field and circularly polarized field), a so-called "birdcage antenna" is provided and has, by way of example, the circuitry illustrated in FIG. 2. As described at the outset, the birdcage antenna 1 usually has rod-shaped conductors 2 which are parallel to one another and equally spaced apart from one another on a cylinder jacket and are connected to one another by end rings 3, 4. For example, capacitances 5 can be provided in the end rings 3 and 4 between two adjacent straight conductors 2 in each case.

PIN diodes 6 are used in the rods or conductors 2 of the birdcage antenna. Alternatively, it is also possible to use other switching elements, in particular electronic switches such as transistors. This makes it possible to sometimes use the antenna as a circular birdcage antenna, when the switching elements or PIN diodes 6 are switched (on) (closed mode), and sometimes as an opposite coil pair of the end rings 3 and 4, when the switching elements or PIN diodes close (open mode).

The two end rings 3 and 4 preferably satisfy the Helmholtz condition, according to which they are arranged away from one another at a distance of their radius on the same axis and through which current flows in the same direction. A homogeneous magnetic field is therefore produced between the two end rings 3 and 4.

Switching is then alternately carried out between both antenna types, namely the linearly polarized transmission antenna (end rings 3 and 4) and the circularly polarized transmission antenna (rods 2). In this respect, it should be noted that the charging capacitor downstream of the rectifier in the hearing aid is selected to be sufficiently large according to the changeover time.

Since a linear magnetic field, on the one hand, and a circular magnetic field, on the other hand, therefore prevail inside the birdcage antenna 1, magnetic field components are present in the entire interior of the birdcage antenna in all three spatial directions in a temporally distributed manner. This again means that both a vertically oriented receiving antenna 7 and a horizontally oriented receiving antenna 8 can absorb energy in the alternating magnetic field. These receiving antennas 7, 8 are symbolically illustrated in FIG. 2 without a hearing aid.

Two individual sources 9, 10 are used here to control the birdcage antenna 1. One source 10 uses an amplifier 11 and a matching network 12 to feed a signal into a first feed port 13 which is part of the lower end ring 4. This is a two-port element which is formed by the connections of one of the capacitors 5.

The second source 9 uses a phase shifter 14, an amplifier 15 and a matching network 16 to feed a signal into a second feed port 17 which is part of the upper end ring 3. This is likewise a two-port element which is formed by the connections of a capacitor 5 of the end ring 3.

The sources 9 and 10 are connected to the end rings 3, 4 of the birdcage antenna at an angle of 90° with respect to one another. This means that the two feed ports 13 and 17 have an angle of 90° with respect to one another based on the axis of rotation of the birdcage antenna.

The PIN diodes 6 or other switching elements can be used to switch the birdcage antenna to a so-called "birdcage mode" (closed mode), in which the rods provide the decisive magnetic field, and a so-called "Helmholtz mode" (open mode). For the purpose of charging, switching between the two modes is continuously carried out. Therefore, the phase shifter 14 is switched to 90° in the birdcage mode and is switched to 0° in the Helmholtz mode. In addition, the amplitude of both signals from the sources 9, 10 can be weighted according to the load.

According to an alternative embodiment, only one current source is used for charging. This source may be split between both connection points, that is to say the feed ports 13 and 17, using a so-called Wilkinson splitter. It is also possible to use direct digital synthesis (DDS) switching modules for both sources 9, 10. In this case, the adjustable phase shifter 14 could be dispensed with because corresponding phase shifts can already be taken into account when controlling the DDS circuits.

Figure 3:
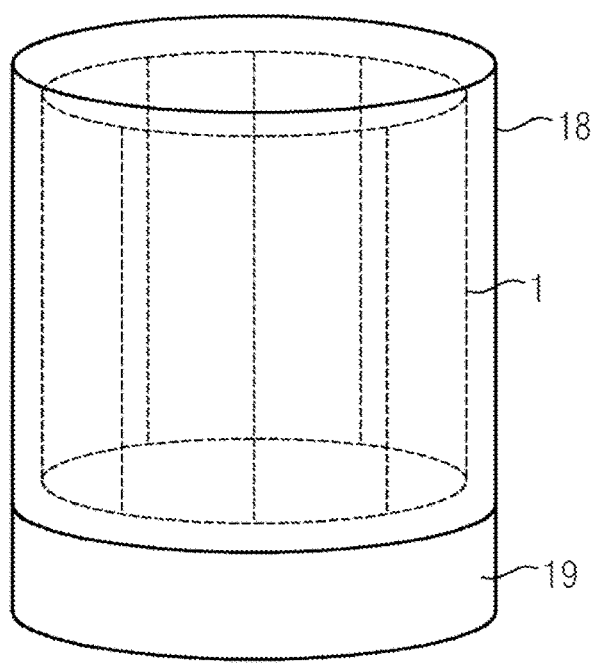
FIG. 3 is a diagrammatic, perspective view of a charging device according to the invention.

FIG. 3 shows the basic structure of a charging device according to the invention. The charging device has a container 18 which is cylindrical. The birdcage antenna 1 is integrated in the wall of the container 18. In the example in FIG. 3, a charging circuit 19 is situated at the bottom of the container 18. The charging circuit 19 contains the above components 9 to 12 and 14 to 16. The charging circuit 19 may naturally be arranged in any desired manner on the container 18. In any case, a hearing aid to be charged or else a plurality of hearing aids can be introduced into the container 18 in any desired orientation and position and effective charging is always possible. The charging of one or more hearing aids is therefore independent of their position and orientation inside the charging system. This provides a high degree of user-friendliness of the charging system.

The invention claimed is:

1. A charging device for wirelessly charging at least one hearing aid, the charging device comprising:
   a cylindrical container defining a cylinder axis;
   an antenna for generating an alternating magnetic field in said cylindrical container in an event of electrical excitation;
   a charging circuit for electrically exciting said antenna;
   said antenna being a birdcage antenna having end rings and rods disposed parallel to said cylinder axis around a cylinder jacket, said rods having ends at edges of said cylinder jacket and each of said rods connected to one of said end rings, said birdcage antenna being integrated in said cylindrical container
   switching elements, one of said switching elements disposed in each of said rods of said antenna;
   said charging circuit used to alternately generate, in said antenna, a circular magnetic field, in which case said switching elements are operated in a closed mode, and a linear magnetic field, in which case said switching elements are operated in an open mode; and
   a charging capacitor operatively connected to said charging circuit for defining a switching time for continuously switching between the circular magnetic field and the linear magnetic field during a charging process.

2. The charging device according to claim 1, wherein each of said switching elements is a PIN diode.

3. The charging device according to claim 1, wherein said charging circuit contains two individual sources and two amplifiers.

4. The charging device according to claim 1, wherein said charging circuit has two matching networks.

5. The charging device according to claim 3, wherein said individual sources are connected to said end rings of said antenna in a manner offset through 90° with respect to one another.

6. The charging device according to claim 4, wherein said matching networks are switched in synchronism with said switching elements.

7. The charging device according to claim 1, wherein said charging circuit has a phase shifter.

8. The charging device according to claim 3, wherein said two individual sources each have a direct digital synthesis circuit.

9. The charging device according to claim 1, further comprising a Wilkinson splitter, said charging circuit has only a single source which is connected to said antenna via said Wilkinson splitter.

10. A method for wirelessly charging at least one hearing aid, which comprises the steps of:
    providing a cylindrical container having an integrated birdcage antenna with rods disposed parallel to a cylinder axis on a cylinder jacket and ends of the rods at edges of the cylinder jacket are each connected to an end ring, wherein a switching element is respectively disposed in each of the rods of the birdcage antenna;
    introducing the hearing aid into the cylindrical container;
    alternately generating a circularly polarized magnetic field, in which case the switching elements are operated in a closed mode, and a linearly polarized magnetic field, in which case the switching elements are operated in an open mode, in the birdcage antenna; and
    charging the hearing aid using the two magnetic fields being continuously switched during a charging process.

11. The method according to claim 10, which further comprises controlling a switching between the circular magnetic field and the linear magnetic field via a charging capacitor which defines a switching time.

* * * * *